UNITED STATES PATENT OFFICE.

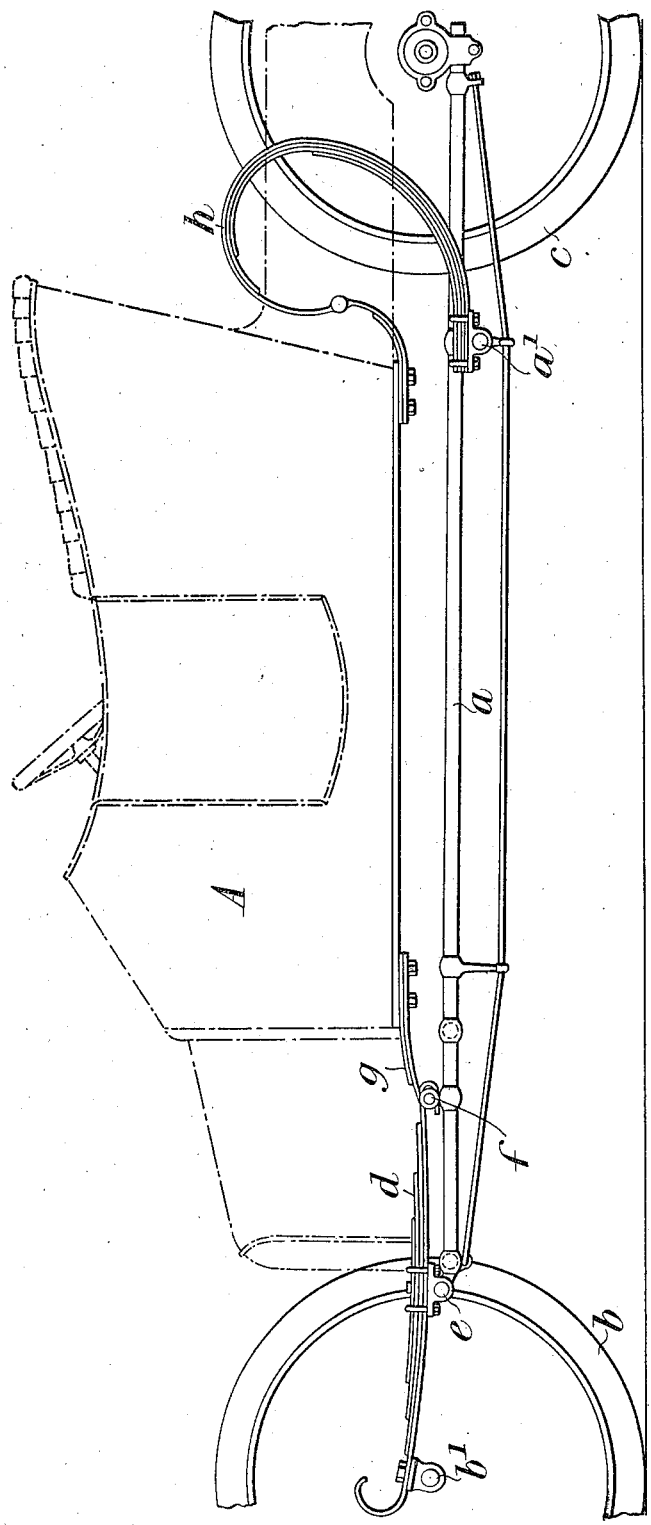

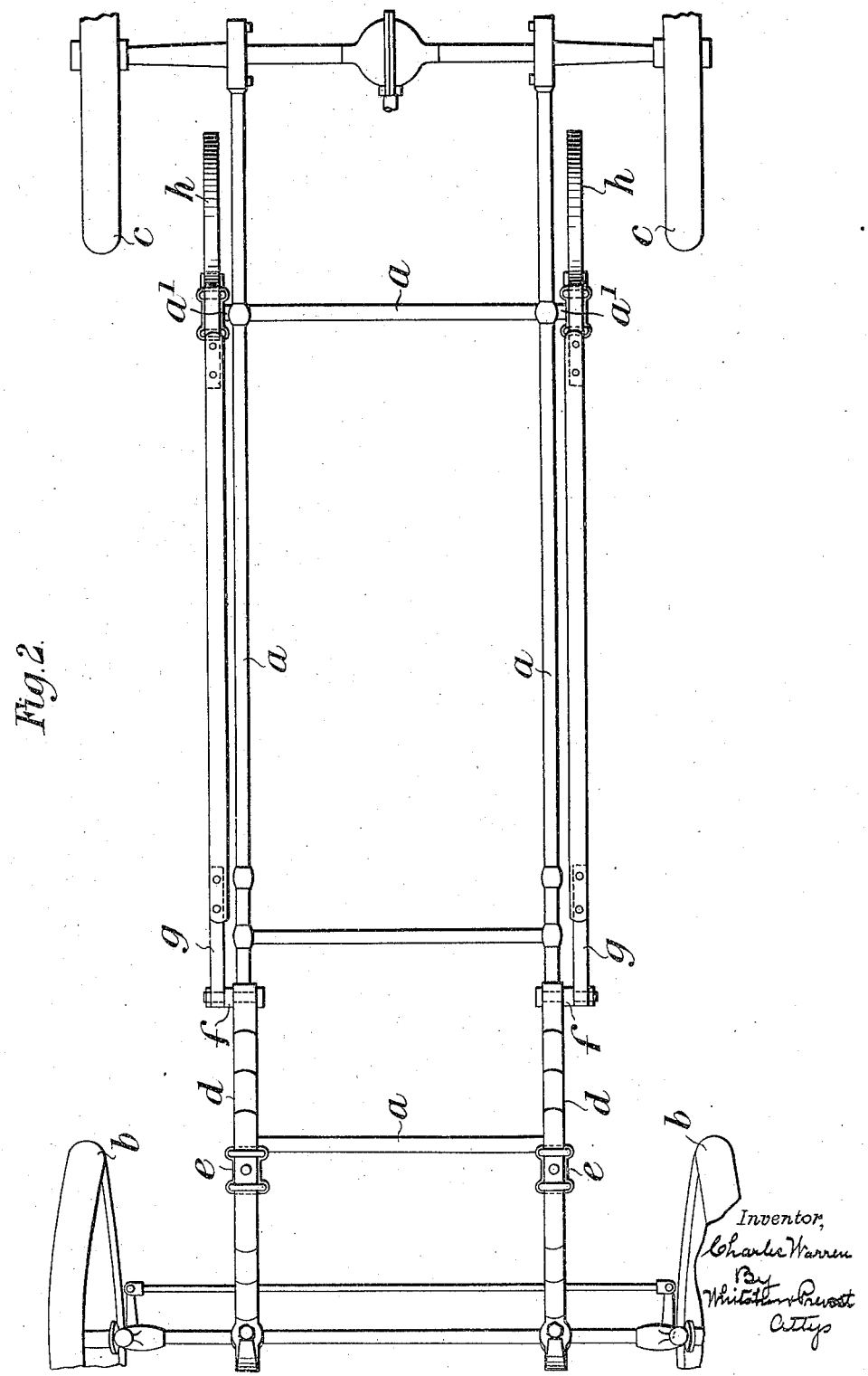

CHARLES WARREN, OF WITHAM, ENGLAND.

CHASSIS FOR MOTOR ROAD-VEHICLES 1,178,364.  Specification of Letters Patent.  Patented Apr. 4, 1916.

Application filed March 29, 1915. Serial No. 17,889.

*To all whom it may concern:*

Be it known that I, CHARLES WARREN, a subject of the King of Great Britain, residing at Garage House, High street, Witham, Essex, England, have invented new and useful Improvements in Chassis for Motor Road-Vehicles, of which the following is a specification.

My invention relates to chassis for motor road vehicles of the kind in which the front or steering wheel axle is secured to the front ends of a pair of leaf springs which project forwardly from the chassis frame which carries the body of the vehicle and are secured to the said frame at their rear ends and at a point approximately at their centers.

According to my invention instead of carrying the body of the vehicle directly upon the chassis frame I support it thereon through the medium of springs.

In a suitable arrangement for carrying out the invention the axle springs are secured at approximately their center to the front end of the chassis frame and bear at their front ends upon the axle of the front or steering wheels of the vehicle, while at the rear ends they are hooked over or slidably attached to pins or the like upon the frame, which said pins also carry the forward ends of springs supporting the front end of the body. The rear end of the body is suspended upon C-springs or other suitable springs extending upward from lateral supports on the frame. With this construction the body is supported upon the chassis in such a manner that the ill effects of engine vibration are absorbed by the springs and I obtain generally a design of light vehicle which will hold well to the road.

To enable the invention to be fully understood I will describe it by reference to the accompanying drawing, in which:—

Figure 1 is a side elevation of my improved chassis for motor road vehicles, and Fig. 2 is a plan view thereof.

$a$ is the chassis which is in the form of a rectangular frame-work, preferably composed as above mentioned of steel tubes in the ordinary manner.

$b$ are the front or steering wheels and $c$ the rear or driving wheels.

$d$ are the forwardly projecting leaf springs which are connected at $e$ to the front end of the chassis frame $a$, this connection being, as above described, approximately at the middle point of the spring as a whole, although the upper leaves of the said spring are not centrally disposed relatively to the said point $e$, as is clearly to be seen in Fig. 1, the purpose being to provide a construction in which the upper leaves of the springs $d$ are graduated and out of center so that the regular vibrating period of the same is broken, thus obviating the necessity of shock absorbers.

$f$ are pins projecting laterally from the chassis frame $a$, and over which the rear ends of the leaf springs $d$ are hooked, the other or front ends of the said springs bearing upon the axle $b^1$ of the front wheels $b$. The rear ends of the springs $d$ are hooked over the pins $f$ to permit slight play at these points, which is made necessary by reason of the rise and fall of the springs, and these hooks also facilitate attaching and detaching the springs and chassis.

$g$ are the springs which are secured at their front ends to the aforesaid lateral pins $f$ and support at their rear ends the front part of the body A of the vehicle, which is shown in broken lines in Fig. 1. The springs $g$ are connected to the chassis by the pins $f$ in order that there will be no portion of the body without spring support and also for the purpose of dispensing with extra attaching means.

$h$ are the C-springs for supporting the rear end of the body A on the chassis $a$ the said springs being carried by lateral supports $a^1$. Although I have shown C-springs for the purpose I may, however, use any other suitable form of springs.

From the foregoing it will be understood that owing to the body being pivoted to the chassis at its front end swaying of the body will be obviated for the reason that the vertical motion would counteract it, and the body being isolated from the chassis no vibration from the engine is felt. It will also be obvious to those skilled in the art that by my improved construction universal joints in the power transmission to a large extent will be dispensed with.

A chassis made as above described enables the body to be suspended in such a manner as to provide considerable freedom from the effects of engine vibration, the design also enabling a light vehicle to be built which holds well to the road.

Claims:

1. In a chassis of the kind hereinbefore referred to, the combination with the forwardly projecting leaf springs of a second pair of springs which at their rear ends support the front part of the body and are connected at their front ends to the points on the chassis at which the rear ends of the said forwardly projecting leaf springs are attached, and a third pair of springs for supporting the rear end of the body on the chassis, substantially as described.

2. In a chassis of the kind described, the combination with the forwardly projecting leaf springs which are connected at their forward ends to the front axle of a vehicle and are connected at the rear side of their central portion to the front end of the chassis, the rear ends of the springs being also connected to the chassis, of a second pair of springs connected at their rear ends to the front end of the body and connected at their front ends to the points of the chassis which the rear ends of the said forwardly projecting leaf springs are attached, and a third pair of springs for supporting the rear end of the body of the chassis.

CHARLES WARREN.

Witnesses:
JOHN E. BOUSFIELD,
C. G. REDFERN.

Copies of this patent may be obtained for five cents each, by addressing the "Commissioner of Patents, Washington, D. C."